Jan. 19, 1932. G. C. THOMAS, JR 1,842,216
CABLE BUSHING
Filed Aug. 1, 1929
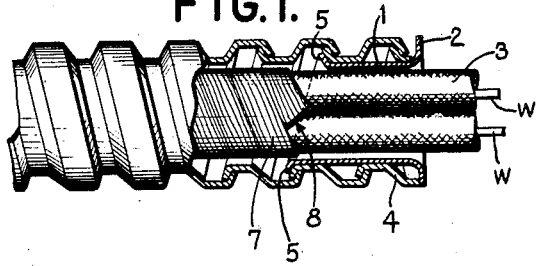
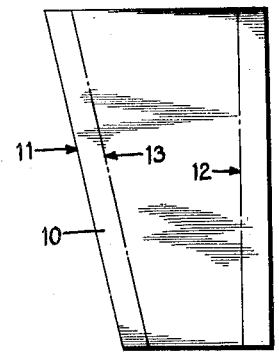
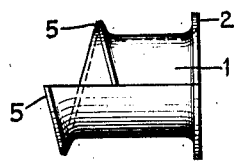
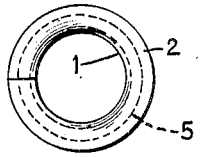
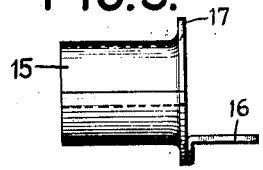
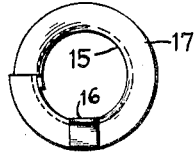
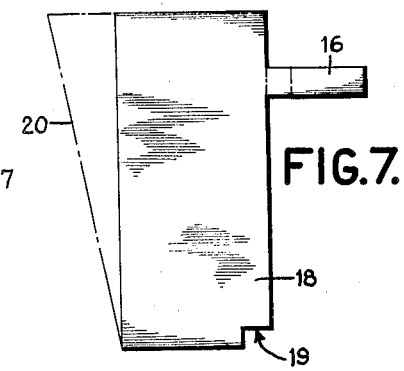
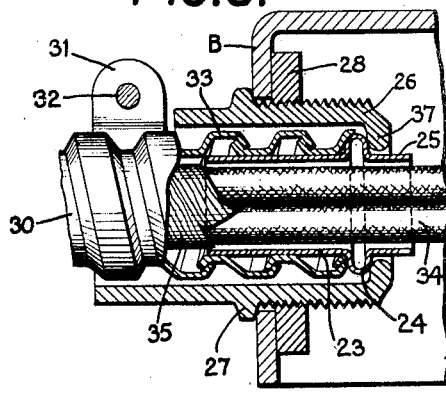
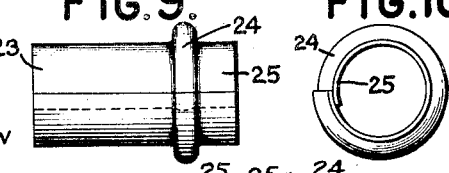
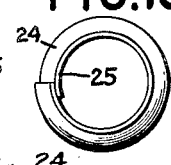
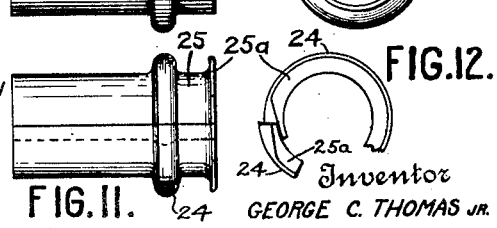
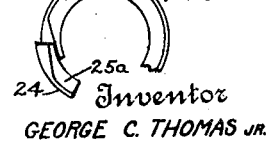
Inventor
GEORGE C. THOMAS JR.
By his Attorneys
Bohleber & Ledbetter Patented Jan. 19, 1932

1,842,216

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE BUSHING

Application filed August 1, 1929. Serial No. 382,758.

This invention relates to cable bushings which are particularly adapted for use with armored cables which have metallic armor spirally and flexibly wound about a soft cable.

These armored cables, particularly when used in a box assembly with an electrical wiring installation, are cut for the connection of lighting fixtures at desired points and the armor surrounding the soft wire insulation within is unwound and cut off, so that the soft cable projects beyond the end of the armor. Usually, these cut off ends of the armor are rough and will tear and abrade the soft cable which, of course, is liable to cause a short circuit resulting in fire or other damage. It is for this reason that the cable bushing described herein has been devised to be inserted within the armor and over the soft cable forming a bushing or protection for the soft cable so that the rough ends of the armor will not come in contact with the cable.

These bushings may be required in certain localities, particularly at the ends of cable where it enters an outlet box, and it is difficult if not impossible after the wiring installation is completed to determine if the bushing has been provided as required in the particular locality. It may be important therefore that some means be provided whereby the presence of the bushing upon the cable may be readily determined.

It is, therefore, an object of this invention to provide a bushing having smooth edges and which may be inserted between the cable and the armor to protect the cable from the sharp edges of the armor.

Another object of this invention is to provide a cable bushing which is to be inserted between the armor and the soft cable to protect the cable from tearing and abrasion, which bushing may be threaded within the armor and the cable.

Another object of the invention is to provide a bushing which has some means for indicating the presence of the bushing upon the cable and within the armor when the cable end is anchored within a connecter for securing the cable within an outlet box hole.

Other objects of the invention will be more apparent from the following description when taken in connection with the drawings in which, Figure 1 shows an armored cable with the armor in section and with the bushing inserted between the armor and the soft cable to protect the cable from the sharp edges of the armor.

Figure 2 is a plan view of the bushing showing the means whereby the bushing is threaded within the armored cable.

Figure 3 is an end view of the bushing as shown in Figure 2.

Figure 4 shows the blank from which the bushing shown in Figure 2 is formed from sheet material.

Figure 5 shows a form of bushing having means which enable the presence of the bushing upon the cable to be determined when the wiring installation is completed.

Figure 6 is an end view of the bushing shown in Figure 5.

Figure 7 shows a development or blank cut from sheet material from which the bushing of Figure 5 is formed.

Figure 8 is a section through a box hole connecter and fragment of a box with the cable mounted therein and carrying a bushing in which the entire end of the bushing projects beyond the connecter in order to indicate the presence of the bushing.

Figure 9 is a view showing the bushing used upon the cable in the box hole mounting of Figure 8.

Figure 10 is an end view of the bushing of Figure 9.

Figure 11 is a modified form of the bushing shown in Figure 9.

Figure 12 is an end view of the bushing of Figure 11.

The cable bushing of this invention is preferably formed of sheet material which is bent into circular form to form the bushing. The end of the bushing is provided with means whereby the bushing may be threaded between the armor and the cable of the armored cable, so that the bushing is more easily inserted therein and is more securely retained in position inasmuch as it cannot be longitudinally withdrawn therefrom.

Ordinarily, these bushings are not visible, or at best may be observed with great difficulty when the cable is mounted within a box hole connecter, and the connecter is mounted within an outlet box hole. It is, therefore, extremely difficult, if not impossible, for a wiring inspector to determine whether such a bushing has been provided or not to prevent abrasion of the cable by the sharp edges of the armor. It is for this reason that means have been provided whereby the presence of a bushing between the armor and the cable may be ascertained by anyone when the cable is mounted within an outlet box connecter or when the wiring installation is completed. The means utilized to render the presence of a bushing to be known after a cable has been mounted within an outlet box connecter may be used with a bushing which has the threaded means for aiding the insertion of a bushing between the armor and the cable, or it may be provided upon a plain bushing which is merely pressed into position between the armor and the cable. The bushings described herein are equally suitable for use on armored cables which have a paper wrapping around the soft cable, or upon armored cables which do not have the paper wrapping.

The cable bushing 1, shown in Figure 1, is cylindrical in form and is turned up at its end to form a flange 2, which forms a protecting means for the soft cable 3 from the sharp edges of the armor 4. As shown in Figure 1, this armor is spirally wound about the soft cable so that the edges of the spiral of the armor interengage to lock the spirals flexibly together as is well known in the art. These spirals are taken advantage of by providing upon the other end of the bushing 1, a spiral flange 5 which is of the same pitch as the spiral of the armor of the cable and is adapted to contact with the armor spiral in the same manner as a screw thread so that rotation of the bushing will pull the bushing into the armor and over the soft cable. This spiral flange also prevents the bushing from being withdrawn longitudinally and the only manner in which it may be removed from the cable end is by unscrewing or rotating the bushing. The up-turned spiral flange 5 also provides a smooth and rounded edge at the inner end of the bushing thereby preventing abrasion of the soft cable upon insertion of the bushing within the armor. One or more projections spirally positioned upon the bushing is an equivalent construction for the continuous spiral flange shown.

In the more recent type of armored cable, the paper wrapping 7 is spirally wrapped about the soft cable and the metallic armor is then spirally wound on top of the paper. In this paper wound cable, the paper is pulled out from about the cable for a short distance within the armor and is torn off, the end 8 of the paper being within the armor and spaced approximately the length of the bushing from the end of the armor. In such paper wound cable, the paper leaves a space which enables the bushing to be more readily inserted between the armor and cable. The bushing, however, is insertable with cables which are not paper wrapped.

The bushing shown in Figures 2 and 3 which is inserted within the armor of the cable shown in Figure 1, is formed from the blank 10 of sheet metal shown in Figure 4. The edge 11 of this blank is at an angle to the other sides of the blank. The flanges 2 and 5 are formed by bending the blank upon the dot and dash lines 12 and 13 respectively as bending axis. When this blank is bent into circular form, the angular edge 11 forms a spiral which gives the flange 5 its screw threaded form. The blank may have the flanges formed simultaneously with the bending of the blank into its circular form or these bending operations may be performed separately as desired.

The flange 2 as shown in Figure 1 abuts against the end of the armor 4 and protects the soft cable from the sharp edges of the armor, and the smooth rounded corner of the flange effects a smooth non-abrading edge for the cable. This flange comes into contact with a bushing or shoulder upon a connecter, to be described, when the cable is mounted in an outlet box hole.

After the cable has once been inserted within the connecter, which connecter is mounted in an outlet box hole, it is practically impossible to determine by inspection whether a bushing has been provided between the armor 4 and the cable 3. In order to make it easily determinable that such a cable bushing has been used, the bushing 15 is provided with a projecting ear 16 which is long enough to extend beyond the end of the connecter and therefore readily visible. The ear may be a narrow one as shown or may have any circumference less than the full circle of the sleeve. This projecting ear in the form shown in Figures 5 to 7, is integral with the bushing flange 17, and is formed from the blank 18 shown in Figure 7. This blank has the edge upon which the ear 16 is mounted, bent up to form the flange 17 and the ear 16 is partially bent along said flange and then at right angles to project axially with respect to the bushing axis as shown in Figure 5. Upon bending the blank 18 into circular form, the adjacent edges of the blank may overlap or may abut as desired. If it is desired to have these edges overlap, the corner 19 of the blank is cut away so that the edges may overlap without interference with the flange 17.

The bushing provided with the visible means or projecting ear may be without threaded means as shown in Figures 5 and 6, or it may be provided with a screw thread flange similar to the flange 5 shown in the bushing of Figure 1. In such case, the blank is cut with one side 20 at an angle to the other sides as shown in Figure 7 and a flange turned up along this edge. Upon bending the blank into circular form to form the bushing, this flange becomes a screw thread flange as previously discussed in the bushing shown in Figures 1 to 4.

Instead of providing merely a projecting ear 16, as shown in Figure 5, the entire end of the bushing may project beyond the end of the connecter. This type of bushing is shown in Figure 8 where the bushing 23 is provided with a flange 24 and a projecting end 25 which projects beyond the end of the connecter 26. Figure 11 shows a modified form of bushing which in all respects is similar to that shown in Figures 8 and 9 except that the projecting end 25 is flared outwardly to form a flange 25a which will overlap the end of the connecter bushing 37. The connecter 26 is mounted in an outlet box hole in the box B by means of the shoulder 27 and nut 28 which is threaded upon a connecter as is well know. The armored cable 30 is securely clamped in the connecter by any type of clamping means and the flexible means 31, having a hole 32 for the reception of a clamp screw is merely illustrative of one form of clamping means. The bushing 23 is shown inserted between the armor 33 and the soft cable 34 of the armor cable. Although this cable is shown as being wrapped with paper 35, it is to be understood that the bushing is equally adaptable for either the paper wound cable or the cable which is not provided with paper winding. As shown in Figure 8, the flange 24 not only protects the soft cable from the sharp edges of the armor 33, but also abuts against the bushing 37 of the connecter forming a stop for the cable end. The flange in all of the bushings shown herein abut against the connecter bushing in the same manner as the flange 24 abuts against the connecter bushing 37.

This type of bushing may be constructed with the edges overlapping or abutting as desired. Similarly, this bushing may be provided with a screw thread flange so that the bushing may be threaded within the armor as has been fully discussed, particularly with reference to the bushing shown in Figure 2. A detailed discussion of a screw thread flange upon this bushing will therefore not be given.

It will be seen, that I have provided a bushing which may be threaded between the armor and the soft cable of an armored cable in order to protect the soft cable from the sharp edges of the armor where it is cut off for connection with lighting fixtures. The bushing may be provided with means whereby the presence of such a bushing is readily determinable after the wiring job is completed and the armored cable is secured within a connecter, which connecter is in turn retained in position in an outlet box hole.

Various forms of means which will render the presence of the bushing determinable by inspection are obvious as well as threaded means by which the bushing may be threaded within the armor, in addition to those shown and described herein and it is to be understood that the invention is not to be limited by the specific and preferred forms shown and described herein excepting as defined in the accompanying claims.

What is claimed is:

1. A cable bushing to be inserted between the spiral armor and the soft cable of an armored cable comprising a sleeve, a flange upon one end of said sleeve for engagement with the end of the armor, the other end of the bushing being spiral, and a flange formed by bending up the spiral end of the bushing for engagement with the spirals of the armor.

2. A cable bushing adapted to be inserted between the armor and the soft cable of an armored cable comprising a sleeve, a flange upon said sleeve for engagement with the end of the armor and an ear projecting from said sleeve beyond the flange.

3. A cable bushing adapted to be inserted between the armor and the soft cable of an armored cable comprising a sleeve, a flange upon said sleeve for engagement with the end of the armor and an ear carried by the outer edge of the flange and bent inwardly therefrom, the end of the ear projecting beyond the flange on said sleeve.

4. A cable bushing adapted to be inserted between the armor and the soft cable of an armored cable comprising a sleeve, a flange upon said sleeve for engagement with the end of the armor, an ear projecting from said sleeve beyond the flange, and means upon said bushing for engagement with the spirals of the armor to thread the bushing between the armor and the soft cable.

5. A cable bushing adapted to be inserted between the armor and the soft cable of an armored cable comprising a sleeve, a flange upon said sleeve for engagement with the end of the armor, an ear carried by the outer edge of the flange and bent inwardly therefrom, the end of the ear projecting beyond the flange on said sleeve and means upon said bushing for engagement with the spirals of the armor to thread the bushing within the armor.

6. A cable bushing adapted to be inserted between the armor and the soft cable of an armored cable comprising a sleeve, a flange upon said sleeve for engagement with the end of the armor, an ear projecting from said sleeve beyond the flange, and a spiral flange upon said bushing for engagement with the spirals of the armor.

7. An outlet box assembly comprising an outlet box having an outlet opening through a wall of the box, a connector within the opening, means to anchor the connector within the opening, an armored cable within the connector, means to secure the armored cable to the connector, a bushing of insulating material inserted between the armor and the soft cable of the armored cable, a flange on the bushing engaging the edge of the armor, a spiral flange carried by the bushing engaging the spiral of the armor, and means carried by the bushing projecting beyond the end of the connector.

In testimony whereof I affix my signature.

GEORGE C. THOMAS, Jr.